Patented Feb. 16, 1932

1,845,356

UNITED STATES PATENT OFFICE

EDWARD E. SORENSEN, OF DETROIT, MICHIGAN, ASSIGNOR, BY DIRECT AND MESNE ASSIGNMENTS, TO PAUL F. SCHOLBE, OF DETROIT, MICHIGAN

REFRIGERANT

No Drawing. Application filed August 24, 1928, Serial No. 301,939. Renewed June 29, 1931.

This invention relates to a refrigerant and has to do particularly with a refrigerant adapted to be used in a compression type refrigerating unit.

Various standard refrigerants are now being used in automatic refrigerating units of the domestic or household type, and the majority are giving measurably good results. While these various refrigerants as are now being used have their advantageous points, the majority of the same are open to one main objection, and that is, a relatively high pressure must be used to compress the same.

I have discovered what may be termed a low pressure refrigerant in that it is very efficient when operated at low pressures. This refrigerant consists of a mixture of diethyl carbonic ester ($C_5H_{10}O_3$) and methyl or ethyl alcohol.

This diethyl carbonic ester is preferably made by distilling equal parts of ethyl potassium carbonate and potassium sulphate.

The refrigerant is formed by diluting either methyl or ethyl alcohol with varying parts of diethyl carbonate ester. In the preferred form the ratio of diethyl carbonic ester never exceeds 40% of the entire solution by volume.

The refrigerant which I prefer to use consists of 20 parts by volume of diethyl carbonate ester and 80 parts by volume of ethyl alcohol.

What I claim is:

1. A new product for use as a refrigerant, comprising alcohol and diethyl carbonic ester.

2. A refrigerant of the low pressure type, comprising ethyl alcohol and diethyl carbonic ester.

3. A refrigerant of the low pressure type, comprising alcohol and diethyl carbonic ester, the proportion of diethyl carbonic ester being less than 40% by volume.

4. A new product for use as a refrigerant, comprising approximately 20 parts by volume of diethyl carbonic ester and 80 parts by volume of alcohol.

5. A new product for use as a refrigerant, comprising approximately 20 parts by volume of diethyl carbonic ester and 80 parts by volume of ethyl alcohol.

In testimony whereof I affix my signature.

EDWARD E. SORENSEN.